(12) United States Patent
Qian et al.

(10) Patent No.: US 12,579,755 B2
(45) Date of Patent: Mar. 17, 2026

(54) OVERLAYING AUGMENTED REALITY (AR) CONTENT WITHIN AN AR HEADSET COUPLED TO A MAGNIFYING LOUPE

(71) Applicant: THE JOHNS HOPKINS UNIVERSITY, Baltimore, MD (US)

(72) Inventors: Long Qian, Baltimore, MD (US); Peter Kazanzides, Baltimore, MD (US); Mathias Unberath, Baltimore, MD (US); Tianyu Song, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 486 days.

(21) Appl. No.: 17/791,058

(22) PCT Filed: Jan. 5, 2021

(86) PCT No.: PCT/US2021/012167
§ 371 (c)(1),
(2) Date: Jul. 6, 2022

(87) PCT Pub. No.: WO2021/141887
PCT Pub. Date: Jul. 15, 2021

(65) Prior Publication Data
US 2023/0027801 A1 Jan. 26, 2023

Related U.S. Application Data

(60) Provisional application No. 62/957,693, filed on Jan. 6, 2020.

(51) Int. Cl.
*G06T 19/00* (2011.01)
*A61B 90/00* (2016.01)
(Continued)

(52) U.S. Cl.
CPC .......... *G06T 19/006* (2013.01); *G02B 25/004* (2013.01); *G06T 5/80* (2024.01);
(Continued)

(58) Field of Classification Search
USPC ......................................................... 382/154
See application file for complete search history.

(56) References Cited

U.S. PATENT DOCUMENTS

| | | | |
|---|---|---|---|
| 7,889,212 B2* | 2/2011 | Schulz | G06F 3/0481 |
| | | | 345/428 |
| 2015/0135125 A1* | 5/2015 | Bhatt | G06F 3/0481 |
| | | | 715/781 |

(Continued)

FOREIGN PATENT DOCUMENTS

| | | | | |
|---|---|---|---|---|
| WO | WO-2018039270 A1 * | 3/2018 | | G06F 3/14 |
| WO | WO-2019043025 A1 * | 3/2019 | | A63F 13/5255 |

OTHER PUBLICATIONS

K. R. Moser, M. S. Arefin and J. E. Swan, "Impact of Alignment Point Distance and Posture on SPAAM Calibration of Optical See-Through Head-Mounted Displays," 2018 IEEE International Symposium on Mixed and Augmented Reality (ISMAR), Munich, Germany, 2018, pp. 21-30 (Year: 2018).*

(Continued)

*Primary Examiner* — Chineyere Wills-Burns
*Assistant Examiner* — Lucius Cameron Gree Allen
(74) *Attorney, Agent, or Firm* — MH2 Technology Law Group LLP

(57) ABSTRACT

A computer-implemented method for displaying augmented reality (AR) content within an AR device coupled to one or more loupe lenses comprising: obtaining calibration parameters defining a magnified display portion within a display of the AR device, wherein the magnified display portion corresponds to boundaries encompassing the one or more loupe (Continued)

lenses; receiving the AR content for display within the AR device; and rendering the AR content within the display, wherein the rendering the AR content comprises: identifying a magnified portion of the AR content to be displayed within the magnified display portion, and rendering the magnified portion of the AR content within the magnified display portion.

17 Claims, 12 Drawing Sheets

(51) Int. Cl.

| | |
|---|---|
| *A61B 90/50* | (2016.01) |
| *G02B 25/00* | (2006.01) |
| *G02B 27/01* | (2006.01) |
| *G06F 3/01* | (2006.01) |
| *G06F 3/04845* | (2022.01) |
| *G06T 5/80* | (2024.01) |
| *G06T 19/20* | (2011.01) |
| *G06V 10/25* | (2022.01) |

(52) U.S. Cl.
CPC .............. *G06T 19/20* (2013.01); *G06V 10/25* (2022.01); *G06T 2219/2004* (2013.01); *G06T 2219/2016* (2013.01)

(56) References Cited

U.S. PATENT DOCUMENTS

| | | | | |
|---|---|---|---|---|
| 2017/0124928 | A1 * | 5/2017 | Edwin | G01B 11/22 |
| 2017/0200313 | A1 * | 7/2017 | Lee | H04N 9/3194 |
| 2018/0303574 | A1 * | 10/2018 | Ramirez Luna | H04N 13/257 |
| 2019/0005848 | A1 | 1/2019 | Garcia Kilroy et al. | |
| 2019/0076020 | A1 * | 3/2019 | Steffen | G02B 21/0012 |
| 2019/0239850 | A1 * | 8/2019 | Dalvin | A61B 8/4245 |
| 2019/0254753 | A1 * | 8/2019 | Johnson | G02B 27/017 |
| 2020/0117025 | A1 * | 4/2020 | Sauer | G02C 9/00 |
| 2021/0015583 | A1 * | 1/2021 | Avisar | G06F 3/1454 |
| 2022/0334636 | A1 * | 10/2022 | Miettinen | G06F 3/013 |

OTHER PUBLICATIONS

Hong Hua, Chunyu Gao and N. Ahuja, "Calibration of a head-mounted projective display for augmented reality systems," Proceedings. International Symposium on Mixed and Augmented Reality, Darmstadt, Germany, 2002, pp. 176-185 (Year: 2002).*

Hua et al. "Calibration of a head-mounted projective display for augmented reality systems," Proceedings. International Symposium on Mixed and Augmented Reality, Darmstadt, Germany, 2002, pp. 176-185 (Year: 2002).*

Moser et al. ("Impact of Alignment Point Distance and Posture on SPAAM Calibration of Optical See-Through Head-Mounted Displays," 2018 IEEE International Symposium on Mixed and Augmented Reality (ISMAR), Munich, Germany, 2018, pp. 21-30) (Year: 2018).*

International Search Report and Written Opinion in corresponding International Application No. PCT/US2021/012167 mailed on Apr. 15, 2021, 5 pages.

* cited by examiner

Accessory Device 320

AR Magnifying Loupe System 100

Network 330

Calibration and Rendering Component 310

300

400

410    Obtain system calibration parameters

420    Obtain user-specific calibration parameters

430    Render AR content based on system calibration and
       user-specific calibration parameters

500

510  Receive calibration camera specifications

520  Receive input calibration images from calibration cameras

530  Measure distortion

540  Store distortion correction and/or additional manufacturing calibration parameters

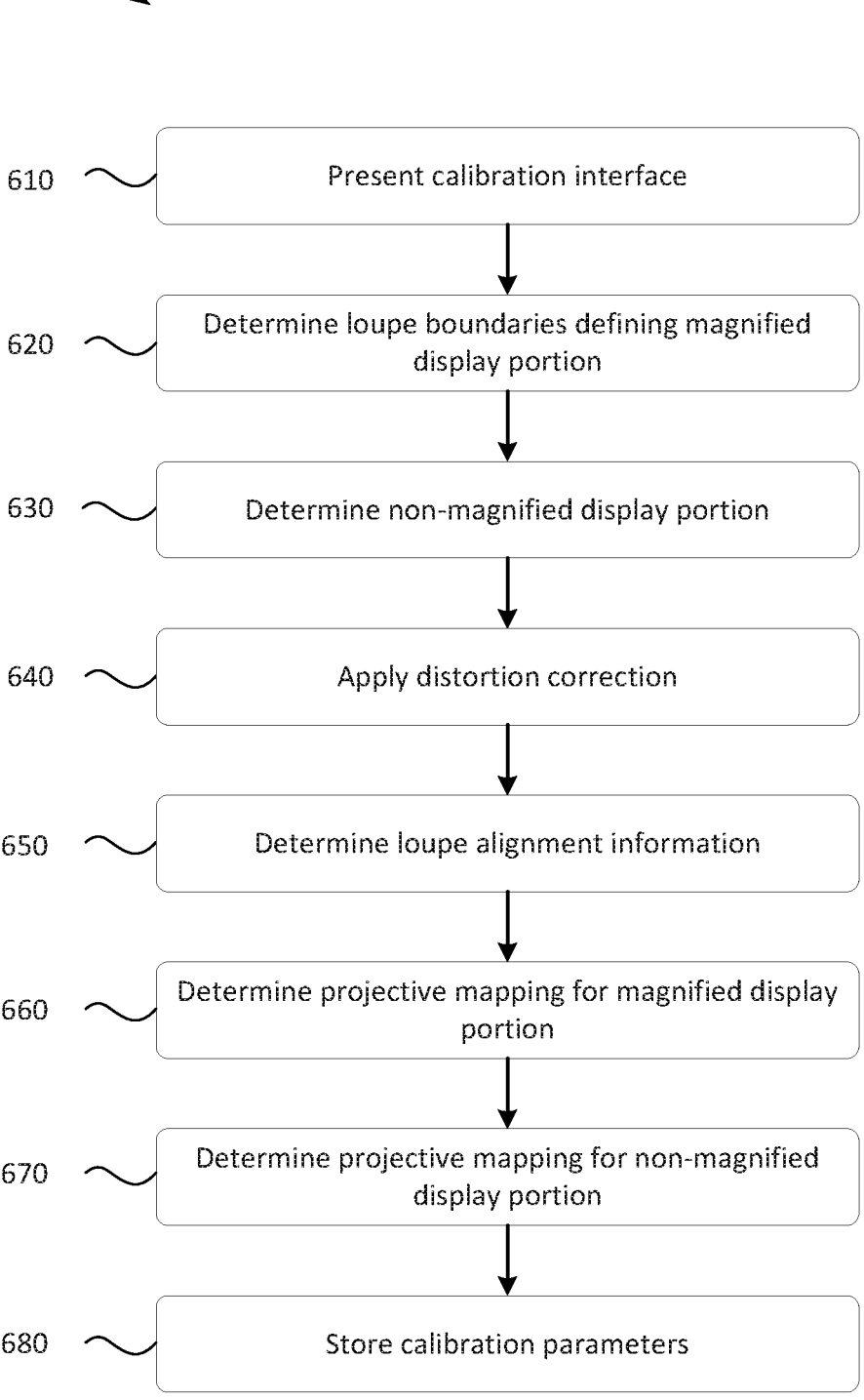

600

610    Present calibration interface

620    Determine loupe boundaries defining magnified display portion

630    Determine non-magnified display portion

640    Apply distortion correction

650    Determine loupe alignment information

660    Determine projective mapping for magnified display portion

670    Determine projective mapping for non-magnified display portion

680    Store calibration parameters

710    Access system calibration parameters

720    Access user-specific calibration parameters

730    Render magnified AR content within magnified display portion and apply distortion correction 740    Render non-magnified AR content within non-magnified display portion 750    Render non-magnified AR content within occluded display portion Trackable Object

202

Rendered AR Content (Unmagnified)

204

114

Rendered AR Content (Magnified)

204

114

202

OVERLAYING AUGMENTED REALITY (AR) CONTENT WITHIN AN AR HEADSET COUPLED TO A MAGNIFYING LOUPE

CROSS REFERENCE TO RELATED APPLICATIONS

The present application is a national stage entry of International Patent Application No. PCT/US2021/012167, filed on Jan. 5, 2021, and published as WO 2021/141887 A1 on Jul. 15, 2021, which claims the benefit of U.S. Provisional Patent Application No. 62/957,693 filed Jan. 6, 2020, the entire disclosures of which are hereby incorporated by reference in their entireties.

BACKGROUND

A head-mounted magnifying loupe may be used in a variety of fields, such as electronics manufacturing/maintenance, watch and jewelry manufacturing/maintenance, high-precision applications, surgical procedures (e.g., dentistry, orthopedic surgery, organ repair surgery, veterinary surgery applications, etc.), or the like. The use of magnifying loupes may enhance visualization of fine detail, compensate for the loss of near vision (presbyopia), improve posture, and generally aid in the performance of surgery.

Augmented Reality (AR) is a technology that superimposes or overlays a computer-generated or virtual image on a user's view of the real world, thus providing a composite view of real world and virtual imagery. An AR headset or goggles may be used in conjunction with AR technology whereby virtual images may be displayed within the AR headset.

SUMMARY

In one example aspect, a computer-implemented method includes: a computer-implemented method for displaying augmented reality (AR) content within an AR device coupled to one or more loupe lenses comprising: obtaining calibration parameters defining a magnified display portion within a display of the AR device, wherein the magnified display portion corresponds to boundaries encompassing the one or more loupe lenses; receiving the AR content for display within the AR device; and rendering the AR content within the display, wherein the rendering the AR content comprises: identifying a magnified portion of the AR content to be displayed within the magnified display portion, magnifying the magnified portion of the AR content, compensating for optical distortion, and rendering the magnified portion of the AR content within the magnified display portion.

In another example aspect, a computer program product includes a computer readable storage medium having program instructions embodied therewith. The program instructions are executable by an augmented reality (AR) device and cause the AR device to perform operations including: obtaining calibration parameters defining a magnified display portion within a display of the AR device, wherein the magnified display portion corresponds to boundaries encompassing the one or more loupe lenses; receiving AR content for display within the AR device; and rendering the AR content within the display, wherein the rendering the AR content comprises: identifying a magnified portion of the AR content to be displayed within the magnified display portion, magnifying the magnified portion of the AR content, compensating for optical distortion, and rendering the magnified portion of the AR content within the magnified display portion In another example aspect a system includes a processor, a computer readable memory, a non-transitory computer readable storage medium associated with a computing device, and program instructions executable by the computing device to cause the computing device to perform operations comprising obtaining calibration parameters defining a magnified display portion within a display of the AR device, wherein the magnified display portion corresponds to boundaries encompassing the one or more loupe lenses; receiving the AR content for display within the AR device; and rendering the AR content within the display, wherein the rendering the AR content comprises: identifying a magnified portion of the AR content to be displayed within the magnified display portion, magnifying the magnified portion of the AR content, compensating for optical distortion, and rendering the magnified portion of the AR content within the magnified display portion.

BRIEF DESCRIPTION OF THE DRAWINGS

FIG. 6 shows an example flowchart of a process for calibrating the AR magnifying loupe system for a specific user in accordance with aspects of the present disclosure.

DETAILED DESCRIPTION

Figure 1B:
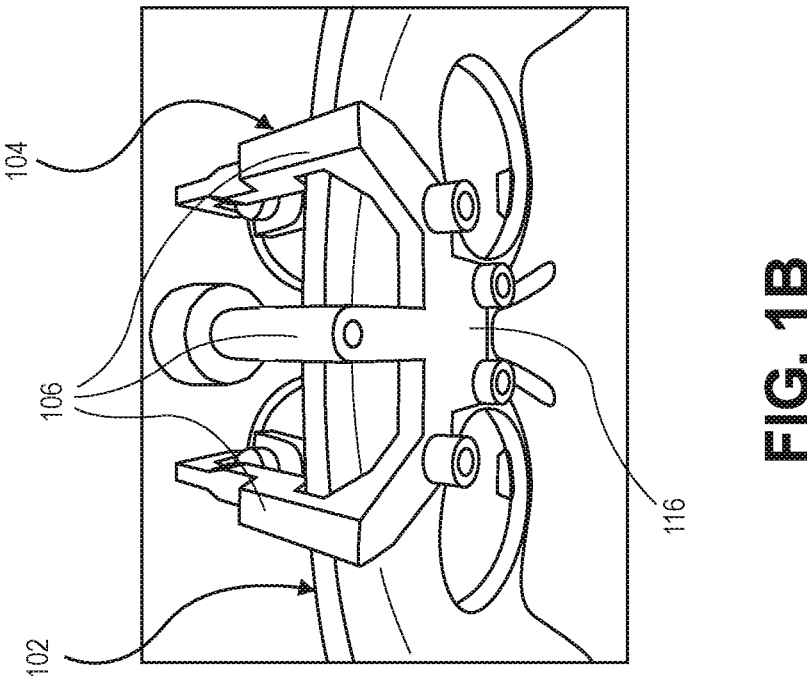
FIGS. 1A and 1B illustrate the AR magnifying loupe system with one example loupe mounting system in accordance with aspects of the present disclosure.

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

Aspects of the present disclosure may include an augmented realty (AR) headset with a magnifying loupe coupled to the AR headset. For example, aspects of the present disclosure may include an optical see through head-mounted display (OST-HMD) AR magnifying loupe system that may be used in surgical applications to aid in the performance of surgery. As described herein, the AR magnifying loupe system may overlay AR content (e.g., virtual content) within the field of view of a user to aid in the performance of surgery. Example AR content that may be presented within an AR headset display may include measurements of an item of interest (e.g., a growth, organ tissue, etc.), instructions, labels, or any other variety of virtual content. In practice, other virtual content may be presented for a variety of purposes.

As further described herein, aspects of the present disclosure may include a software component that calibrates the AR magnifying loupe system for a specific user such that virtual content is properly displayed within magnified portions and non-magnified portions of the user's view. That is to say, virtual content may appear to be magnified within the magnified portions of the user's view (e.g., within the portion of the user's view that encompasses the magnifying loupes), and may appear to be non-magnified within the non-magnified portions of the user's view. In addition, virtual content may be overlaid in portions of the user's view that are otherwise obstructed (e.g., due to the case that surrounds the loupe). In this way, the AR magnifying loupe system, in accordance with aspects of the present disclosure, may render AR content in conjunction with a loupe to aid in the performance of surgery and/or other types of applications.

In some embodiments, the AR magnifying loupe system may include a hardware component and a software component. The hardware component may include an apparatus for mounting a magnifying loupe (e.g., a pair of loupe lenses) to an AR headset. Any type of mounting device or mounting technique may be used to mount the magnifying loupe to the AR headset and aspects of the present disclosure are not limited to the type of physical mounting hardware used to mount the magnifying loupe to the headset. In some embodiments, the mounting device may be removable to remove the magnifying loupe from the AR headset. Additionally, or alternatively, the mounting device may include adjusting hardware to adjust the position of the magnifying loupe relative to the AR headset. Additionally, or alternatively, the magnifying loupe may be non-removable and integrated to the AR headset.

While the techniques described herein are discussed in terms of magnifying loupes, in practice, similar techniques may be applied for minifying loupes or loupes that provide a collapsed or scaled down view. Thus, the term "magnifying" may also be used interchangeably with the term "minifying."

Embodiments of the disclosure may also include a system, a method, and/or a computer program product at any possible technical detail level of integration. The computer program product may include a computer readable storage medium (or media) having computer readable program instructions thereon for causing a processor to carry out aspects of the present disclosure.

Figure 1A:
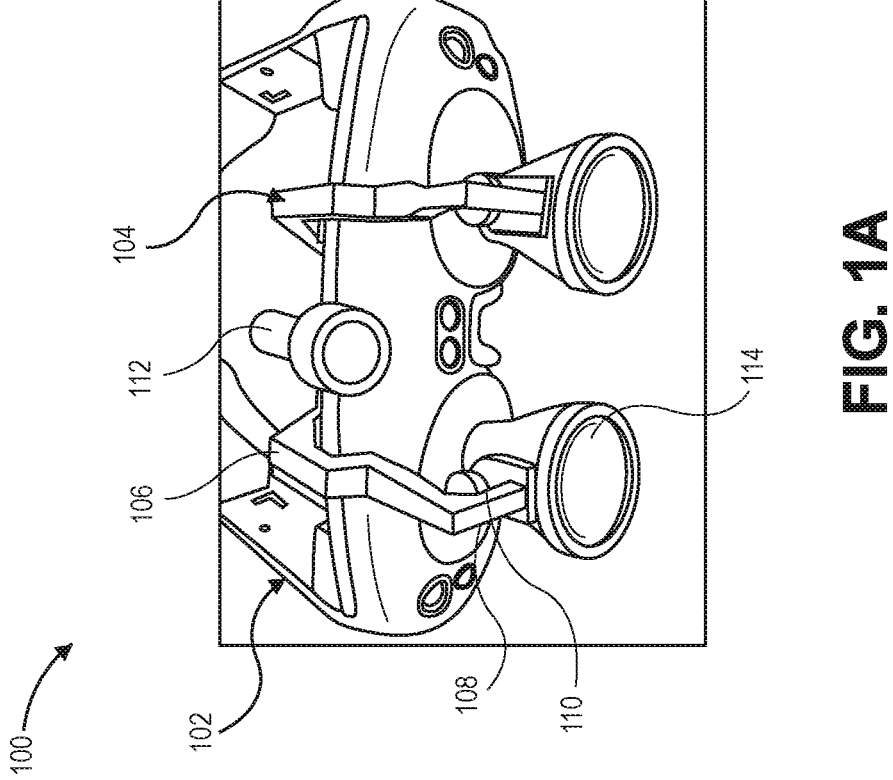

FIGS. 1A and 1B illustrate the AR magnifying loupe system with one example loupe mounting system in accordance with aspects of the present disclosure. As shown in FIG. 1A, the AR magnifying loupe system 100 may include an AR headset 102 and a loupe mount 104. The AR headset 102 may include a head-mounted display device that provides a simulated visual environment through a pair of physical display optic lenses, allowing the user to see both a digital display with virtual content and the real-world through the device lenses. In some embodiments, the AR headset 102 may be worn by a user similar to eyeglasses, or may be otherwise head-mounted or worn in some other manner. The AR headset 102 may render any variety of virtual content within its display lenses for any variety of purposes and applications in a manner that allows the user to see both real-world and virtual content superimposed or overlaid on real-world imagery. As further described herein, the AR headset 102 may include a calibration and rendering component to magnify the display of virtual content in magnified portions of the AR headset 102 lenses (e.g., portions in which the user's field of view passes through loupe lenses 114 coupled to the AR headset 102).

The loupe mount 104 may include hardware components used to mount loupe lenses 114 to the AR headset 102. In the example shown in FIG. 1A, the loupe mount 104 may include a bracket 106 with an extending portion 108, and lens mounting screws 110. In some embodiments, the loupe mount 104 may include an accessory cradle 112 (e.g., for mounting an accessory, such as a flashlight to the AR headset 102). As shown in FIG. 1A, the loupe lenses 114 may be substantially circular and may be mounted substantially in the center of the lenses/display portions of the AR headset 102.

Referring to FIG. 1B, the loupe mount 104, may include a rear portion 116 which may include a plate that may be mounted flush against a rear of the AR headset 102. In some embodiments, the brackets 106 may extend from the rear portion 116. In some embodiments, the loupe mount 104 may include a clamp, mounting hardware, etc., for coupling to the AR headset 102 via the rear portion 116.

As described herein, the specific hardware and mounting techniques used to couple the magnifying loupe and/or loop lenses 110 to the AR headset 102 may be different than what is shown in FIGS. 1A and 1B. In practice, the arrangement, shape, quantity, and size of components of the loupe mounting apparatus 104 may vary from what is shown. Also, in some embodiments, one or more components of the loupe mounting apparatus 104, including the loupe lenses 110, may be removable, adjustable, or non-removable from the AR headset 102 (e.g., integrated with the AR headset 102). Also, the loupe mounting apparatus 104 may include adjustments to account for various interpupillary distances of different users. While FIGS. 1A and 1B illustrate AR magnifying loupe system 100 with a pair of loupe lenses 114, in some embodiments, the AR magnifying loupe system 100 may include a single loupe lens 114. Similar processes and details discussed herein may apply whether the AR magnifying loupe system 100 includes a pair of loupe lenses 114 or a single loupe lens 114.

Figure 2:
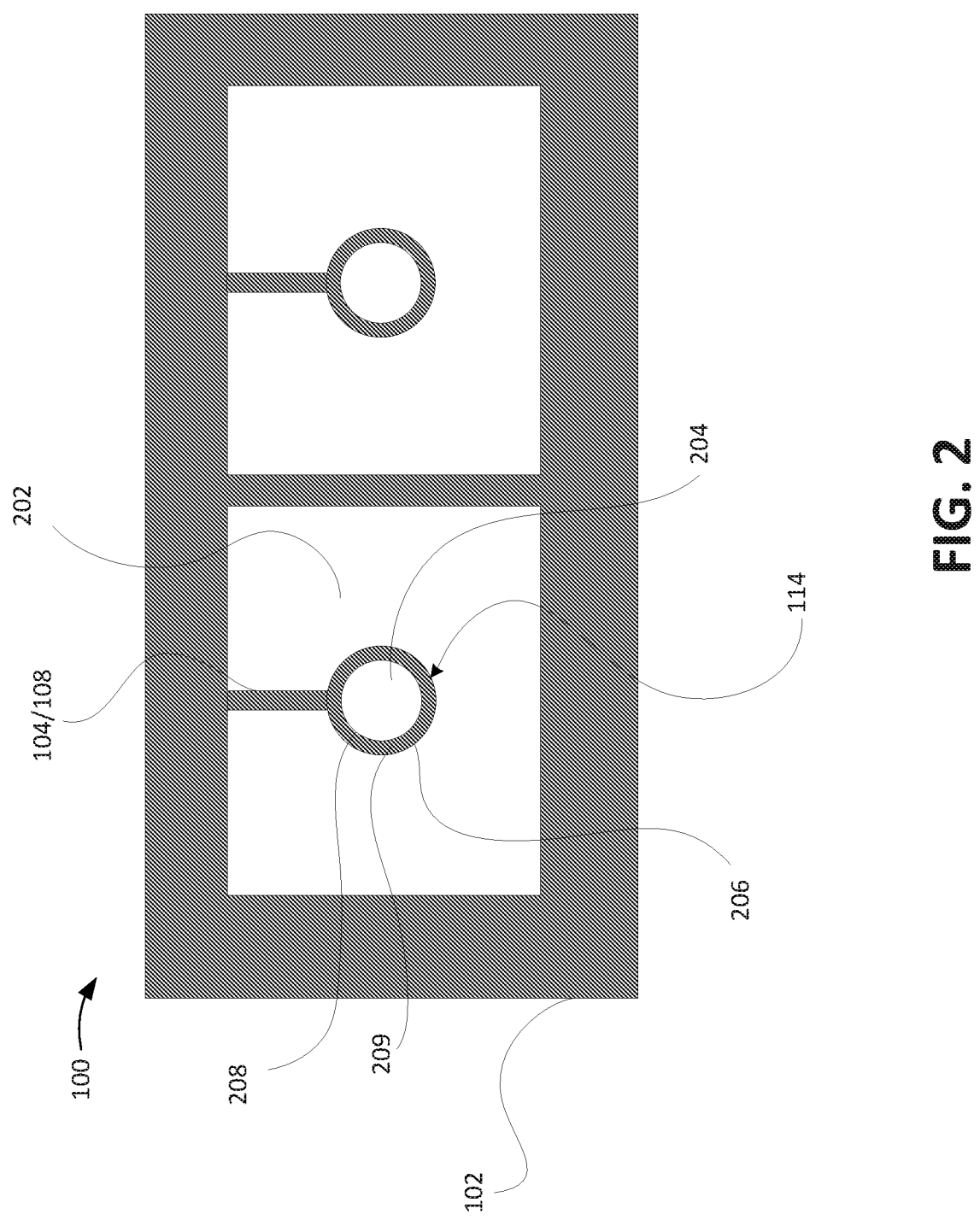
FIG. 2 illustrates details of a front view of an example AR magnifying loupe system in accordance with aspects of the present disclosure.

FIG. 2 illustrates details of a front view of an example AR magnifying loupe system in accordance with aspects of the present disclosure. As shown in FIG. 2, the AR headset 102 may include a pair of loupe lenses 114. When in use (e.g., worn by a user, each loupe lens 114 is positioned in front of each user's eye. For clarity and simplicity, the details of one lens in the pair of lenses in the AR headset 102 are labeled in FIG. 2 and discussed herein. As shown in FIG. 2, the AR headset 102 may include a non-magnified display portion 202 and a magnified portion 204. As described herein, the non-magnified portion may include the portion of the AR headset 102 display lens that is outside of the perimeter of the loupe lens 114 (e.g., outside of the outer edge 206 of the loupe lens 114). The magnified portion 204 may include the portion of the AR headset 102 display lens that is within the perimeter of the loupe lens 114 (e.g., within the inner edge 208 of the loupe lens 114). The inner edge 208 and the outer edge 206 may form an occluded area 209 therebetween. As described in greater detail herein, a calibration process may be performed whereby the user of the AR magnifying loupe system 100 may define the boundaries corresponding to the borders of the outer edge 206 and the inner edge 208 such that the AR headset 102 magnifies the display of virtual content within the magnified portion 204, does not magnify the display of virtual content within the non-magnified portion 206, and can display additional virtual content in the ring-shaped region between inner edge 208 and outer edge 206.

Figure 3:
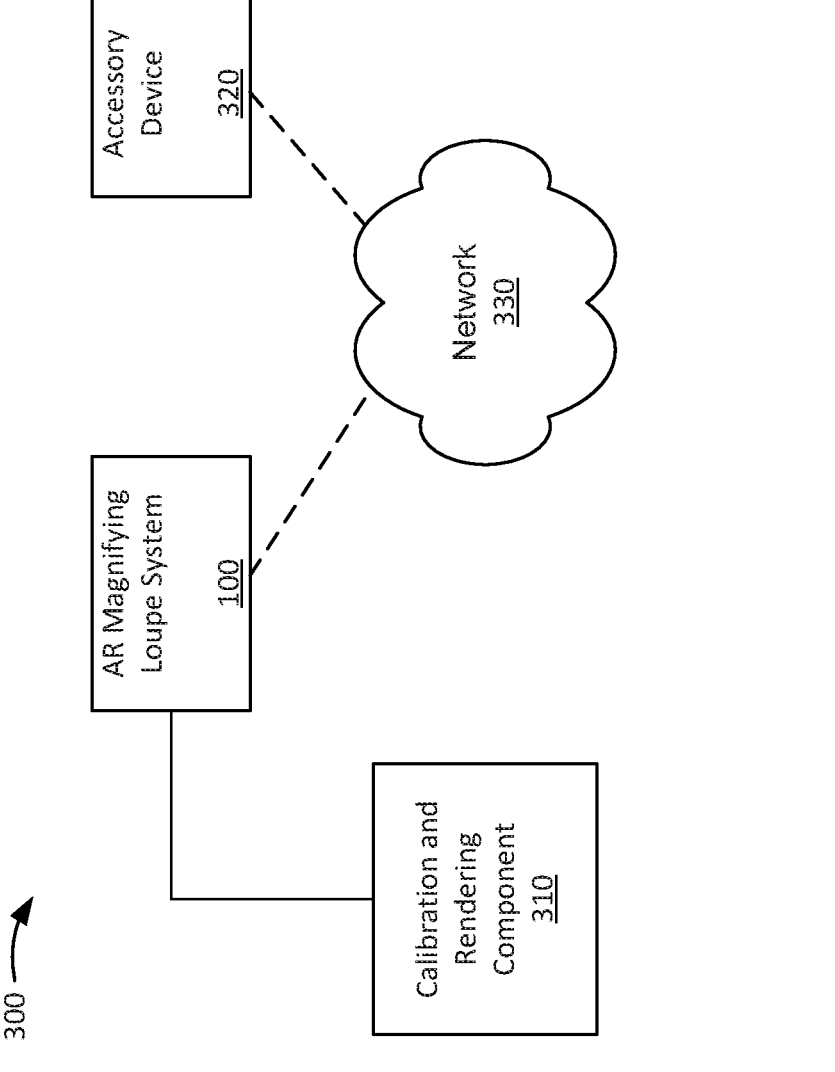
FIG. 3 illustrates an example environment in accordance with aspects of the present disclosure.

FIG. 3 illustrates an example environment in accordance with aspects of the present disclosure. As shown in FIG. 3, the environment 300 includes the AR magnifying loupe system 100, the accessory device 320, and a network 330.

The AR magnifying loupe system 100 may include an AR headset 102 and a loupe mount 104 to mount loupe lenses 114 to the loupe mount 104, as previously discussed above with respect to FIGS. 1A and 1B. As further shown in FIG. 3, the AR magnifying loupe system 100 may include a calibration and rendering component 310. In some embodiments, the calibration and rendering component 310 may be implemented within the AR magnifying loupe system 100. For example, the calibration and rendering component 310 may include a software component or application hosted by the AR headset 102. Additionally, or alternatively, one or more functions of the calibration and rendering component 310 may be implemented externally of the AR headset 102.

As described herein, the calibration and rendering component 310 may perform system calibration and user calibration of the AR headset 102 so that the AR headset 102 may properly render virtual content for a specific user. As described herein, the system calibration may be performed at a manufacturing stage in which distortion correction is performed using calibration cameras to simulate a user's eyes. The user calibration may include calibrating the AR headset 102 for a specific user, including determining loupe boundary information defining magnified and non-magnified display portions of the AR headset 102 display lenses, and determining the user's field-of-view alignment information. The user-specific calibration parameters may be based on the user's specific field of view and the user's specific visual behaviors and/or biometrics (e.g., user eye size, shape, retina size/position, interpupillary distance, etc.). As further described herein, the user-specific calibration may involve receiving user input defining the magnified and non-magnified boundaries, and alignment information through the use of a trackable object (e.g., using a single point active alignment method (SPAAM) eye-based tracking automation calibration techniques, Interaction-Free Display Calibration (INDICA), Display-relative Calibration (DRC) or other alignment technique).

As described herein, the calibration and rendering component 310 may manage the rendering of virtual content within the AR headset 102 display lenses. More specifically, the calibration and rendering component 310 may render any variety of virtual content (e.g., from an application implemented within or external to the calibration and rendering component 310). The calibration and rendering component 310 may render a magnified version of the virtual content within the magnified portions of the AR headset 102, and may render a non-magnified version of the virtual content within the non-magnified portions of the AR headset 102.

The accessory device 320 may include one or more computing devices (e.g., a desktop computer, a laptop computer, a mobile device, such as a smart phone, tablet, etc.) that can be used in conjunction with the AR magnifying loupe system 100. In some embodiments, the accessory device 320 may host an application that provides content to the AR magnifying loupe system 100 to be rendered within the AR headset 102. Additionally, or alternatively, the accessory device 320 may be used to provide user input to the AR headset 102 with respect to the user defining magnified and non-magnified portions/boundaries. In some embodiments, one or more of the functions of the accessory device 320 may be implemented within the AR magnifying loupe system 100, or external to the AR magnifying loupe system 100.

The network 330 may include one or more wired and/or wireless networks. For example, the network 330 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 330 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 330 may include copper transmission cables, optical transmission fibers, wireless transmission, routers, firewalls, switches, gateway computers and/or edge servers.

The quantity of devices and/or networks in the environment 300 is not limited to what is shown in FIG. 3. In practice, the environment 300 may include additional devices and/or networks; fewer devices and/or networks; different devices and/or networks; or differently arranged devices and/or networks than illustrated in FIG. 3. Also, in some implementations, one or more of the devices of the environment 300 may perform one or more functions described as being performed by another one or more of the devices of the environment 300. Devices of the environment 300 may interconnect via wired connections, wireless connections, or a combination of wired and wireless connections.

Figure 4:
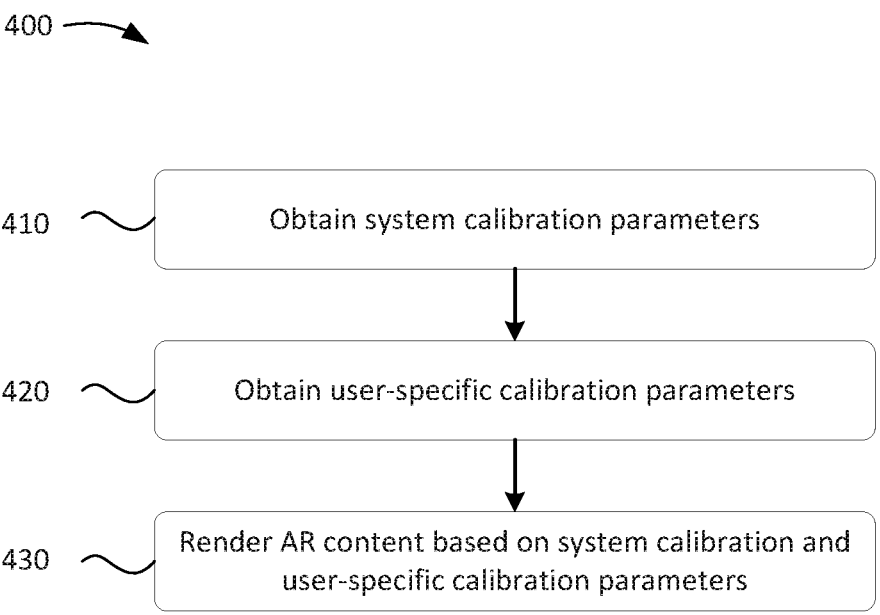
FIG. 4 shows an example flowchart of a process for rendering AR content within an AR magnifying loupe system based on system calibration parameters and user-specific calibration parameters.

FIG. 4 shows an example flowchart of a process for rendering AR content within an AR magnifying loupe system based on system calibration parameters and user-specific calibration parameters. The blocks of FIG. 4 may be implemented in the environment of FIG. 2, for example, and are described using reference numbers of elements depicted in FIG. 2. As described herein, the flowchart illustrates the architecture, functionality, and operation of possible implementations of systems, methods, and computer program products according to various embodiments of the present disclosure.

As shown in FIG. 4, process 400 may include obtaining system calibration parameters (block 410). For example, the calibration and rendering component 310 may obtain system calibration parameters by performing a system calibration process (e.g., at the manufacturing stage of the AR magnifying loupe system 100). Generally, the system calibration process may be performed to obtain parameters used to remove distortions caused by the loupe lenses 114 coupled to the AR headset 102. That is, the distortion parameters may be used when rendering AR content through the loupe lenses 114 such that the AR content does not appear distorted. Additional details regarding the system calibration process is described in greater detail below with respect to FIG. 5.

Process 400 also may include obtaining user-specific calibration parameters (block 420). For example, the calibration and rendering component 310 may obtain user-specific calibration parameters by performing a user-specific calibration process and presenting a calibration user interface within the display of the AR headset 102. In some embodiments, a user-specific calibration step may be performed to further calibrate the AR magnifying loupe system 100 for use by a specific user, as each user's field and geometry of view may differ. Generally, the user-specific calibration process may be performed to determine alignment, boundary, and position information of the loupe lenses 114, which, in turn, may be used to determine projection matrices for the magnified and non-magnified portions of the AR headset 102 display. Additional details regarding the user-specific calibration process is described in greater detail below with respect to FIG. 6.

Process 400 further may include rendering AR content based on the system calibration and user-specific calibration parameters (block 430). For example, the calibration and rendering component 310 may render AR content within the display of the AR headset 102. Generally, the AR content may be rendered in a manner such that the AR content is magnified within the magnified portions of the AR headset 102 display (e.g., as determined at block 420), with distortion correction parameters applied (e.g., the parameters obtained at block 410). Additional details regarding the rendering of AR content is described in greater detail below with respect to FIG. 7.

Figure 5:
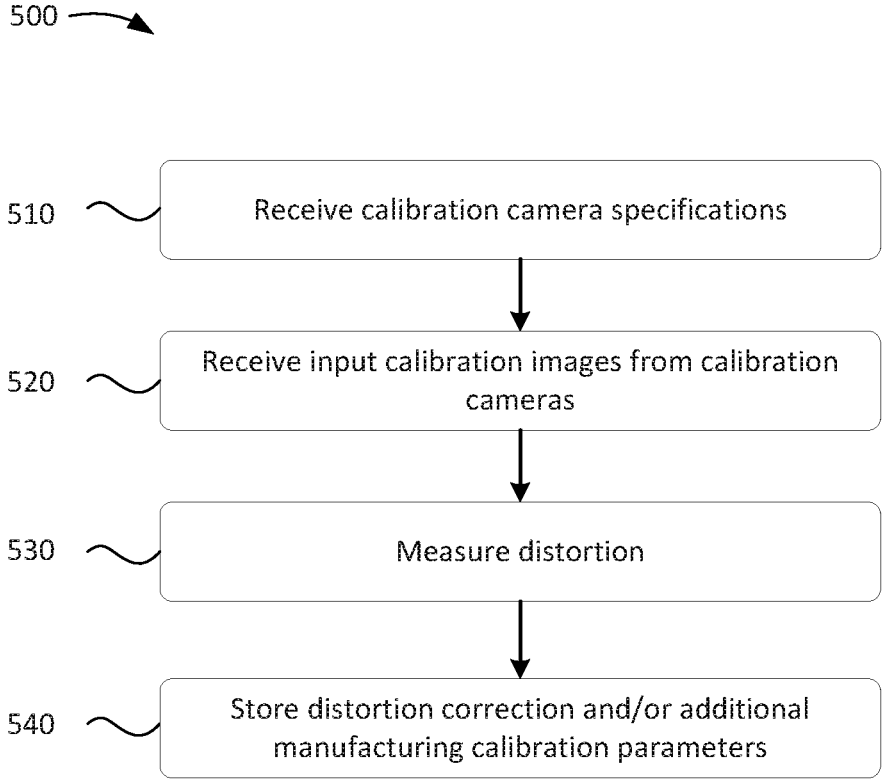
FIG. 5 shows an example flowchart of a process for pre-calibrating the AR magnifying loupe system in accordance with aspects of the present disclosure.

FIG. 5 shows an example flowchart of a process for pre-calibrating the AR magnifying loupe system in accordance with aspects of the present disclosure. The blocks of FIG. 5 may be implemented in the environment of FIG. 2, for example, and are described using reference numbers of elements depicted in FIG. 2. As described herein, the flowchart illustrates the architecture, functionality, and operation of possible implementations of systems, methods, and computer program products according to various embodiments of the present disclosure. In some embodiments, the process of FIG. 5 may be performed during a manufacturing phase of the AR magnifying loupe system 100 to pre-calibrate the AR magnifying loupe system 100 at the manufacturing stage. Generally, the system calibration of FIG. 5 may be performed to obtain parameters used to remove distortions caused by the loupe lenses 114 coupled to the AR headset 102. In some embodiments, process 500 may correspond to sub-steps of process block 410 of process 400.

As shown in FIG. 5, process 500 may include receiving calibration camera specifications (block 510). For example, the calibration and rendering component 310 may receive camera specifications of a pair of calibration cameras used as part of pre-calibrating the AR magnifying loupe system 100. In some embodiments, the calibration cameras may be used to simulate a user's eyes (e.g., a user's view point when wearing the AR magnifying loupe system 100). In some embodiments, the calibration camera specifications may include the distortion parameters, the camera intrinsic matrix, etc. In some embodiments, the calibration camera specifications may be obtained via any type of input, an API, or the like.

Process 500 also may include receiving input calibration images from the calibration cameras (block 520). For example, the calibration and rendering component 310 may receive one or more input calibration images from the calibration cameras in order to perform system calibration. As an example, the calibration cameras may be mounted in a position to simulate the position of a user's eyes when the AR magnifying loupe system 100 is in use. The calibration cameras may capture an image to be used as part of the calibration process in which the image simulates the view of the user through the AR magnifying loupe system 100 when in use. More specifically, the calibration cameras may be positioned such that a field of the view of the calibration cameras includes a view through the loupe lenses 114. As such, the calibration image may include a non-magnified portion and a magnified portion. In some embodiments, the input calibration images may be of a checkerboard, grid, or other known pattern having defined and known features. In some embodiments, distortion correction may be applied to compensate for any distortion present in the calibration cameras (e.g., to more may more accurately simulate what the user would see). Process 500 further may include measuring distortion of the loupe lenses (block 530). For example, the calibration and rendering component 310 may measure the distortion of the loupe lenses 114 by using the input calibration images. As an illustrative example, the calibration and rendering component 310 may compare the positions of features from the input calibration images (e.g., the position of checkerboard positions, grid positions, etc.) with the expected or known positions of these features. The distortion may be measured based on an offset or difference between the features "seen" in the input calibration images by the calibration cameras and the expected or known positions. The output of this measuring process may include distortion correction parameters used for correcting and/or removing the distortion caused by the loupe lenses 114.

Process 500 also may include storing the distortion correction and/or additional calibration-related information (block 540). For example, the calibration and rendering component 310 may store the distortion correction parameters, including the parameters and/or measured distortion of the loupe lenses (e.g., from block 530). In some embodiments, the calibration and rendering component 310 may store any additional calibration-related information for calibrating the AR magnifying loupe system 100 for use, such as focal distance of the loupe lenses 114, manufacturing specifications of the components of the AR magnifying loupe system 100, etc.

FIG. 6 shows an example flowchart of a process for calibrating the AR magnifying loupe system for a specific user in accordance with aspects of the present disclosure. The blocks of FIG. 6 may be implemented in the environment of FIG. 2, for example, and are described using reference numbers of elements depicted in FIG. 2. As described herein, the flowchart illustrates the architecture, functionality, and operation of possible implementations of systems, methods, and computer program products according to various embodiments of the present disclosure.

Figure 8:
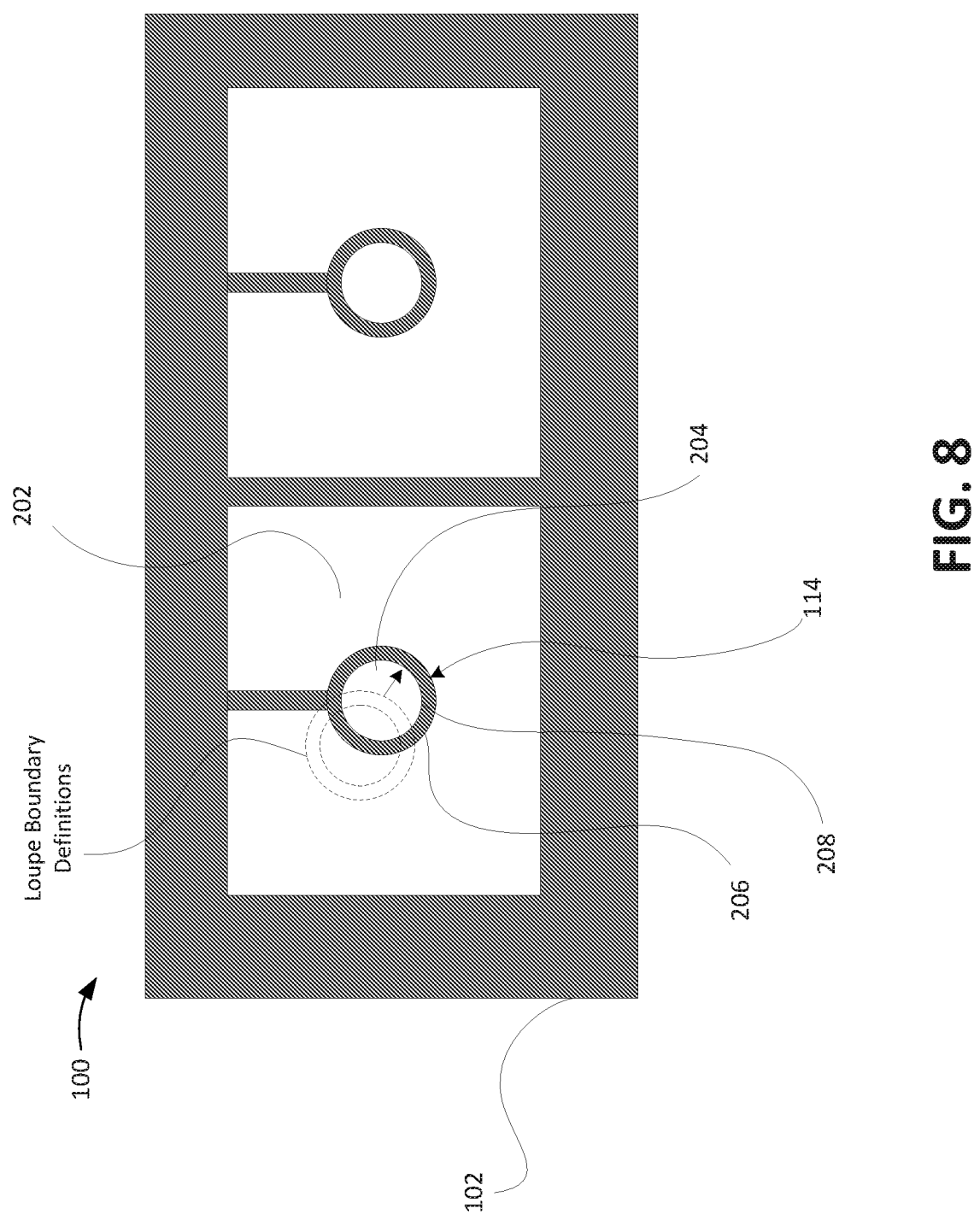
FIG. 8 illustrates an example of a user interface for defining loupe lens boundaries as part of user-specific calibration.

As shown in FIG. 6, process 600 may include presenting a calibration interface (block 610). For example, the calibration and rendering component 310 may present a calibration interface within the display of the AR headset 102. As described herein, the calibration interface may include virtual content representing loupe boundary definitions. An example of the calibration interface with the loupe boundary definitions is shown in FIG. 8.

Process 600 also may include determining loupe boundaries defining a magnified display portion (block 620). For example, the calibration and rendering component 310 may receive user input (e.g., from an input device of the AR magnifying loupe system 100, such as an accessory device 320 in communication with the AR magnifying loupe system 100) that defines the boundaries of the loupe lenses 114. As one example, while wearing the AR magnifying loupe system 100, the user may use the input device to scroll or move the loupe boundary definitions, displayed as part of the calibration interface, to align with the real-life boundaries of the loupe lenses 114. For example, referring to FIG. 8, the user may provide user input to move the loupe boundary definitions (e.g., represented as a hashmark circles) to align with the position of the loupe lenses 114 as is seen by the user while wearing the AR magnifying loupe system 100. In some embodiments, the user may provide input to resize or reposition the loupe boundary definitions as needed for each eye. Through this interactive process, the rendering component 310 may determine the loupe boundaries, including a boundary of an outer edge 206 of the loupe lens 114, and of an inner edge 208 of the loupe lens 114. Additionally, or alternatively, the calibration and rendering component 310 may determine the loupe boundary definitions using any variety of different techniques, such as a retina detection and/or object detection process. As described herein, the magnified display portion of the AR headset 102 display may include an area within the inner edges 208 of each loupe lens 114.

Process 600 further may include determining a non-magnified display portion (block 630). For example, the calibration and rendering component 310 may determine a non-magnified portion of the display of the loupe mount 104 as the portion of the AR headset 102 display outside of the outer edge 206 of each loupe lens 114 (e.g., as defined at block 620). In some embodiments, the calibration and rendering component 310 may identify an occluded area 209 for each loupe lens 114 as a portion between the inner edge 208 and the outer edge 206.

Process 600 may also include applying distortion correction. For example, the calibration and rendering component 310 may apply distortion correction based on the distortion correction parameters previously measured (e.g., at block 540).

Figure 9:
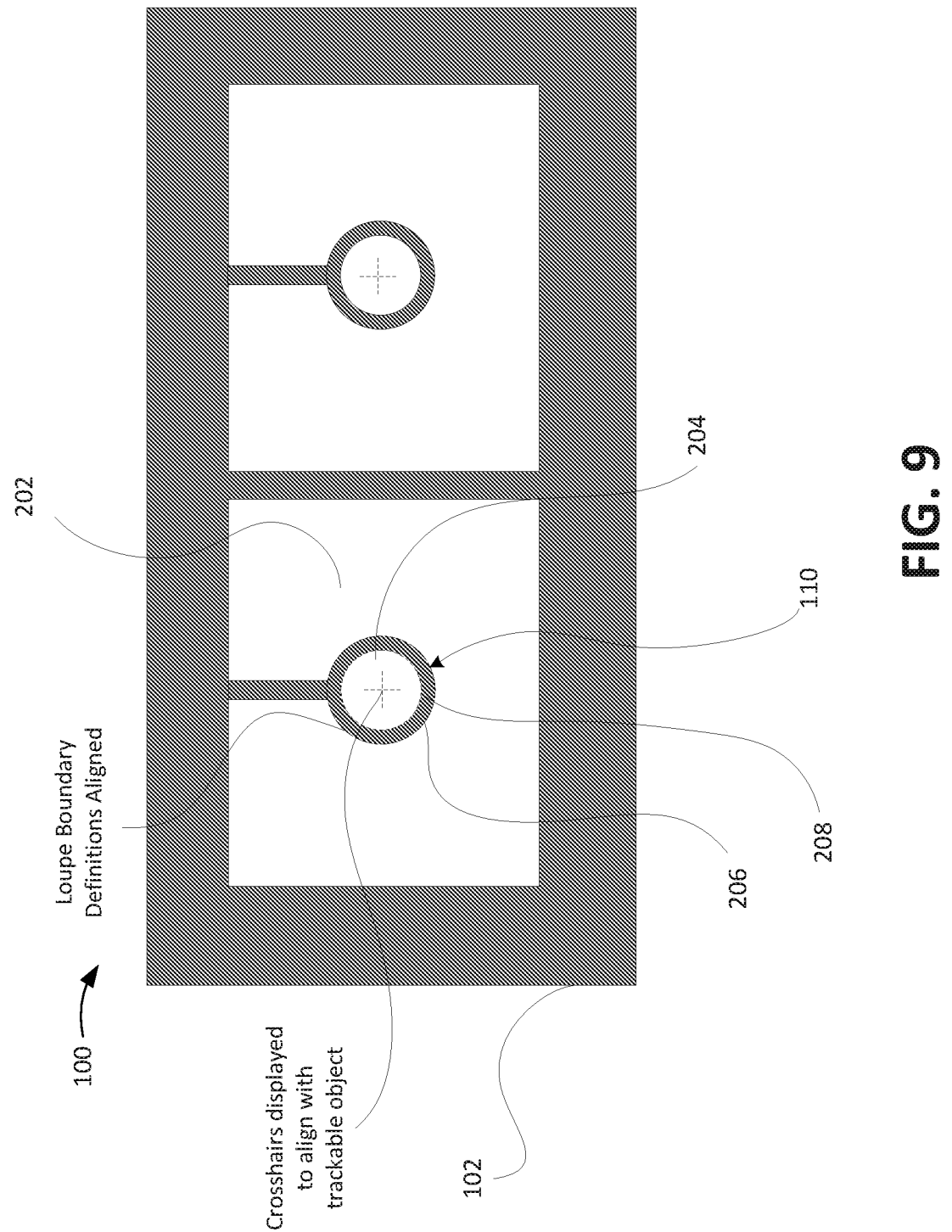
FIG. 9 illustrates an example of a user interface for aligning loupe lens boundaries as part of user-specific calibration.

Process 600 also may include determining loupe alignment information (block 650). For example, the calibration and rendering component 310 may display crosshairs within the AR headset 102 display as part of determining the alignment information for the loupe lenses 114 in relation to the user's eyes (e.g., as shown in FIG. 9). In some embodiments, any suitable variety of alignment techniques may be used, such as the Single Point Active Alignment Method (SPAAM). For example, while the user is wearing the AR magnifying loupe system 100, the crosshairs may be presented and viewable by the user whereby the user may align the crosshairs with a trackable object.

At a first phase of the alignment process, the crosshairs may be presented within the magnified display portion (e.g., within the inner edge 208) and use a trackable object for aligning (e.g., using the SPAAM technique). For example, the trackable object may be an image tracked by a camera of the AR headset 102, infrared reflective object tracked by the AR magnifying loupe system 100, infrared camera, electromagnetic marker, etc. The rendering component 310 may receive a confirmation (e.g., via user input) of the alignment between a fixed or hand-held marker and the displayed crosshair via user interaction. The position of the screen crosshair and the position of the marker at this time may be recorded. The above alignment process may be repeated to improve accuracy and the user alignment inputs may be parsed by a calibration component which optimizes a projective mapping, such as a projection matrix, to fit the alignment data. The above procedure may be performed for left and right eyes separately, or simultaneously. In a simultaneous calibration, the crosshair is visible on both sides of the display of the AR headset 102, and the user may confirm the alignment when the trackable object appears aligned with the crosshairs on the display of the AR headset 102 for both eyes. The above process may be repeated with the crosshairs displayed in the non-magnified portion. An example of the loupe boundaries being defined and aligned is shown in FIG. 9.

Process 600 further may include determining a projective mapping for the magnified displayed portion (block 660). For example, the calibration and rendering component 310 may determine a projective mapping for the magnified display portion based on the defined loupe boundaries defining the magnified display portion (e.g., from block 620), and the loupe alignment information for the magnified display portion (e.g., from block 640). In some embodiments, the projective mapping may be represented by a projection matrix.

Process 600 also may include determining a projective mapping for the non-magnified display portion (block 670). For example, the calibration and rendering component 310 may determine a projection matrix for the non-magnified display portion based on the defined loupe boundaries defining the non-magnified display portion (e.g., from block 630), and the loupe alignment information for the non-magnified display portion (e.g., from block 640). In some embodiments, the projection mapping may be represented by a projection matrix.

Process 600 further may include storing calibration parameters (block 680). For example, the calibration and rendering component 310 may store the calibration parameters, including the loupe boundary inner and outer circle positions (e.g., from block 620), the projective mapping of the magnified display portion (from blocks 640 and 650), and the projective mapping of the non-magnified display portion (from blocks 640 and 660). As described herein, these user-specific calibration parameters may be associated with a user profile identifying the user. Further, the user specific-parameters may be accessed for rendering AR content in a manner that magnifies the AR content within the magnified display portion, without magnifying the AR content outside the magnified display portion.

Figure 7:
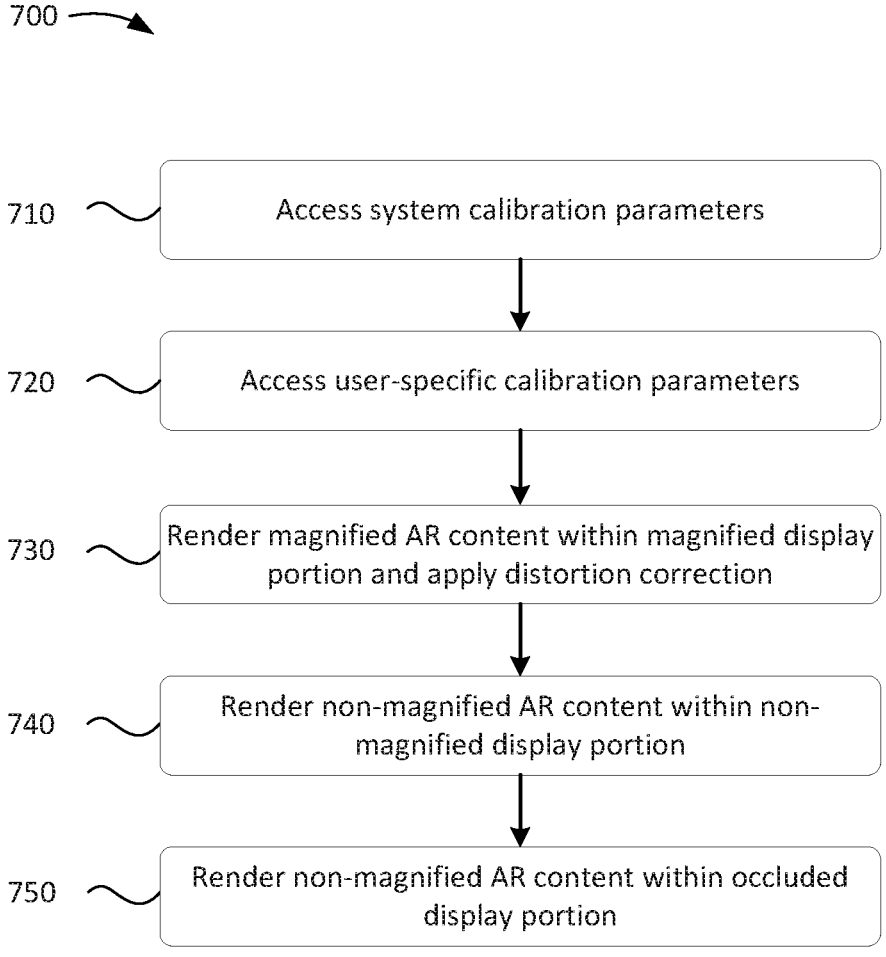
FIG. 7 shows an example flowchart of a process for rendering magnified and non-magnified AR content based on system calibration parameters and user-specific calibration parameters.

FIG. 7 shows an example flowchart of a process for rendering magnified and non-magnified AR content based on system calibration parameters and user-specific calibration parameters. The blocks of FIG. 7 may be implemented in the environment of FIG. 2, for example, and are described using reference numbers of elements depicted in FIG. 2. As noted above, the flowchart illustrates the architecture, functionality, and operation of possible implementations of systems, methods, and computer program products according to various embodiments of the present disclosure.

As shown in FIG. 7, process 700 may include accessing system calibration parameters (block 710). For example, the calibration and rendering component 310 may access the system calibration parameters (e.g., obtained and stored using process 500 of FIG. 5). More specifically, the calibration and rendering component 310 may access system calibration parameters related to distortion correction of AR content to be displayed within the magnified display portion.

Process 700 also may include accessing user-specific calibration parameters (block 720). For example, the calibration and rendering component 310 may access the user-specific calibration parameters (e.g., obtained and stored using process 600 of FIG. 6). More specifically, the calibration and rendering component 310 may access the boundary definitions of the loupe boundaries, the projective mapping of the magnified display portion, and the projective mapping of the non-magnified display portion.

Process 700 further may include rendering magnified AR content within the magnified display portion and apply distortion correction (block 730). For example, the calibration and rendering component 310 may receive AR content from any source, such as from an application hosted by the AR magnifying loupe system 100, an application hosted by the accessory device 320 in communication with the AR magnifying loupe system 100, or from another source. The calibration and rendering component 310 may render the AR content within the magnified display portion (e.g., as determined by the user-specific calibration parameters obtained at block 720) and apply distortion correction (e.g., using the system calibration parameters obtained at block 710). More specifically, the calibration and rendering component 310 may magnify the AR content that maps to the magnified display portion, and render the magnified AR content within the magnified display portion (e.g., within a boundary and location corresponding to the magnified display portion). In some embodiments, the rendering may be magnified at a magnification consistent with the magnification of the loupe lenses 114.

Process 700 also may include rendering non-magnified AR content within the non-magnified display portion (block 740). For example, the calibration and rendering component 310 may render the non-magnified AR content within the non-magnified display portion (e.g., as defined by the user-specific calibration parameters from block 720).

Process 700 also may include rendering AR content within the occluded display portion (block 750). For example, the calibration and rendering component 310 may render AR content within the occluded display portion to maintain continuity between the AR content in the magnified and non-magnified display portions.

While the above describes processes for calibrating and displaying AR content in an AR magnifying loupe system 100 having a pair of loupe lenses 114, similar processes may be performed for calibrating and displaying AR content in an AR magnifying loupe system 100 having a single loupe lenses 114.

FIG. 8 illustrates an example of a user interface for defining loupe lens boundaries as part of user-specific calibration. As previously discussed, (e.g., at process blocks 610 and 620), the calibration and rendering component 310 may display a calibration interface within the AR headset 102. In some embodiments, the calibration interface may include the presentation of loupe boundaries (e.g., inner and outer borders of the loupe lenses 114). As further described herein (e.g., at process block 620), a user may move, resize, or otherwise modify the displayed loupe boundary definitions to align with the loupe lenses 114 (e.g., as indicated by the arrow in FIG. 8).

FIG. 9 illustrates an example of a user interface for aligning real and virtual content as part of user-specific calibration. As previously discussed, (e.g., at process block 640), the calibration and rendering component 310 may display crosshairs whereby the user may align the crosshairs with a trackable object (e.g., the SPAAM technique).

Figure 10A:
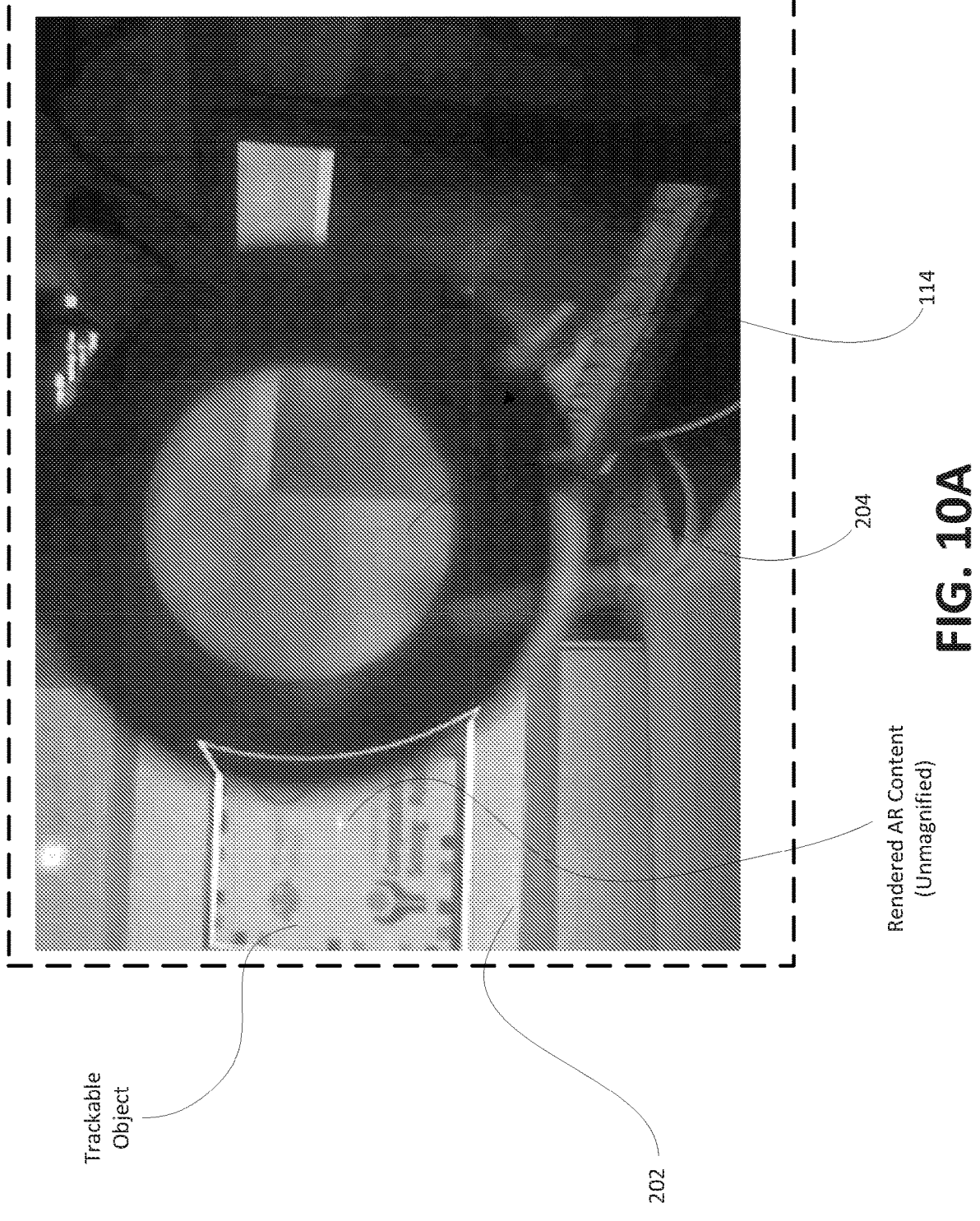
FIGS. 10A and 10B illustrate comparisons of unmagnified and magnified AR content rendered in the display of an AR headset.
Figure 10B:
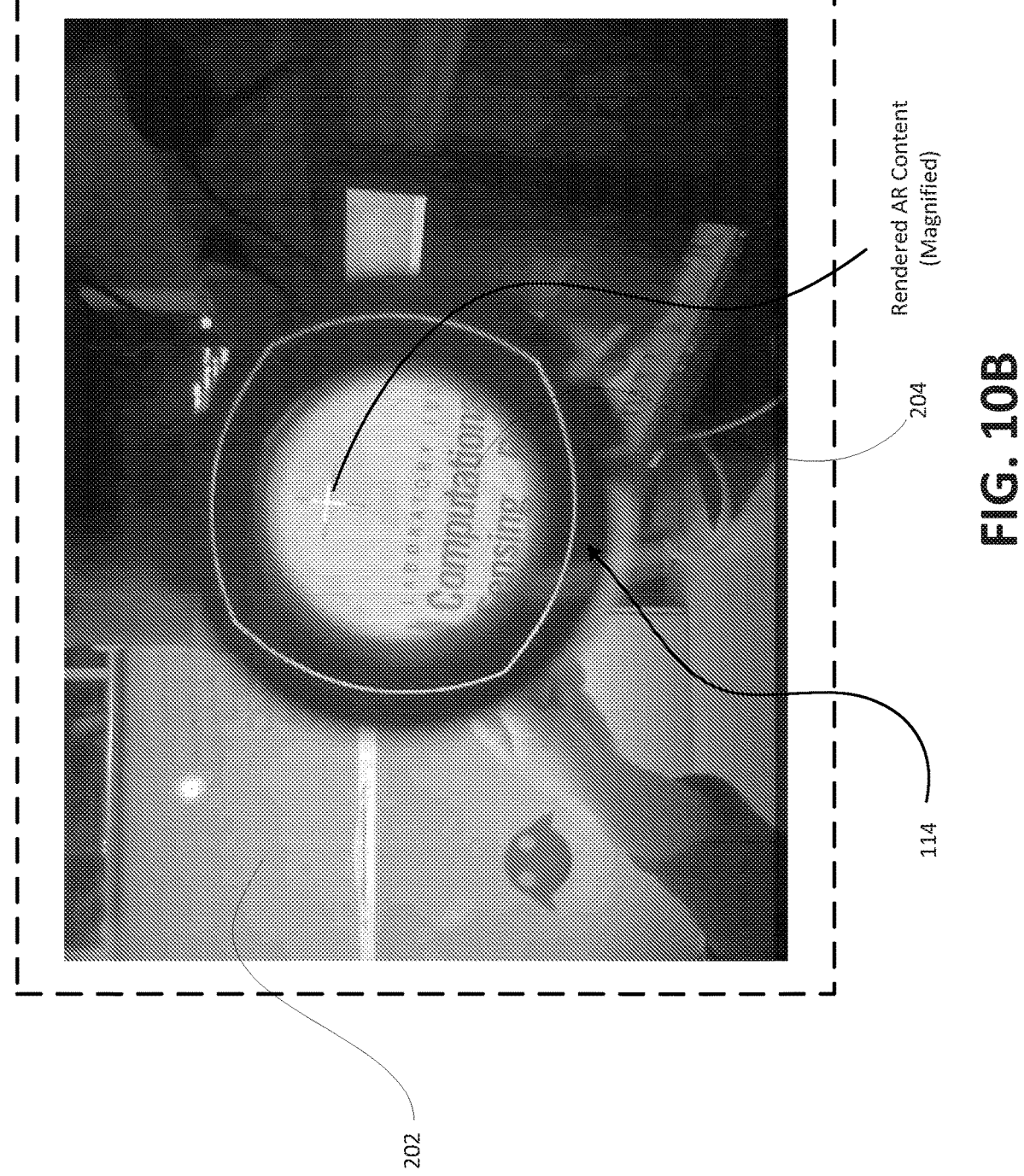

FIGS. 10A and 10B illustrate comparisons of unmagnified and magnified AR content rendered in the display of an AR headset. Referring to FIG. 10A, an example of AR contented rendered within the non-magnified display portion 202 is shown. In the example of FIG. 10A and for illustrative purposes, the AR content is displayed at the crosshairs of a trackable object. In FIG. 10A, the AR content is unmagnified as it is within the non-magnified display portion 202. By comparison, and as shown in FIG. 10B, the AR content may be magnified when the crosshairs of the trackable object are moved to within the magnified display portion 204 (e.g., within the loupe lens 114). As shown in FIG. 10B, the rendered crosshairs appear larger when seen within the magnified display portion 204 such that the magnification of the rendered crosshairs is consistent with the magnification of real-world imagery as seen behind the loupe lens 114. FIGS. 10A and 10B also show rendering of AR content, specifically the rectangular border, in the occluded area. In this example, the rectangular border is warped to improve the transition between the magnified and non-magnified views.

Figure 11:
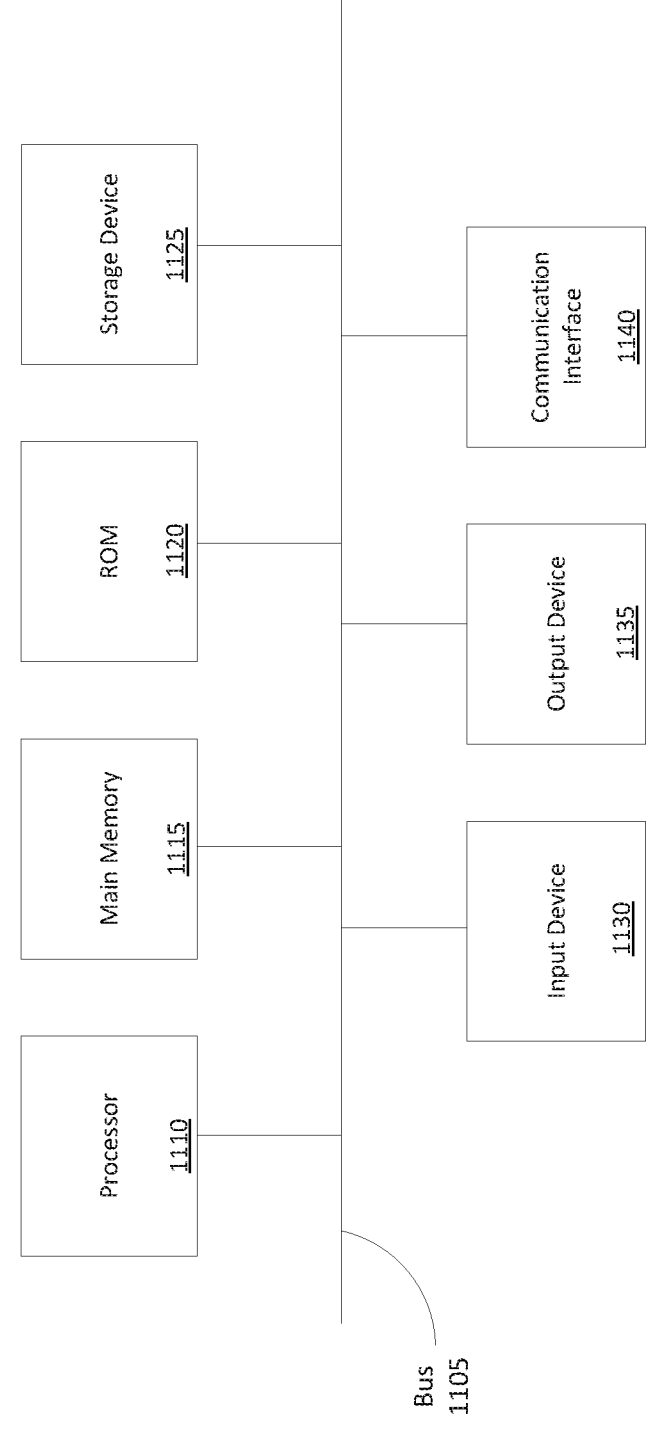
FIG. 11 illustrates example components of a device that may be used within environment of FIG. 3

FIG. 11 illustrates example components of a device 1100 that may be used within environment 300 of FIG. 3. Device 1100 may correspond to the AR magnifying loupe system 100, the calibration and rendering component 310, and/or the accessory device 320. Each of the AR magnifying loupe system 100, the calibration and rendering component 310, and/or the accessory device 320 may include one or more devices 1100 and/or one or more components of device 1100.

As shown in FIG. 11, device 1100 may include a bus 1105, a processor 1110, a main memory 1115, a read only memory (ROM) 1120, a storage device 1125, an input device 1130, an output device 1135, and a communication interface 1140.

Bus 1105 may include a path that permits communication among the components of device 1100. Processor 1110 may include a processor, a microprocessor, an application specific integrated circuit (ASIC), a field programmable gate array (FPGA), or another type of processor that interprets and executes instructions. Main memory 1115 may include a random access memory (RAM) or another type of dynamic storage device that stores information or instructions for execution by processor 1110. ROM 1120 may include a ROM device or another type of static storage device that stores static information or instructions for use by processor 1110. Storage device 1125 may include a magnetic storage medium, such as a hard disk drive, or a removable memory, such as a flash memory.

Input device 1130 may include a component that permits an operator to input information to device 1100, such as a control button, a keyboard, a keypad, or another type of input device. Output device 1135 may include a component that outputs information to the operator, such as a light emitting diode (LED), a display, or another type of output device. Communication interface 1140 may include any transceiver-like component that enables device 1100 to communicate with other devices or networks. In some implementations, communication interface 1140 may include a wireless interface, a wired interface, or a combination of a wireless interface and a wired interface. In embodiments, communication interface 1140 may receive computer readable program instructions from a network and may forward the computer readable program instructions for storage in a computer readable storage medium (e.g., storage device 1125).

Device 1100 may perform certain operations, as described in detail below. Device 1100 may perform these operations in response to processor 1110 executing software instructions contained in a computer-readable medium, such as main memory 1115. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 1115 from another computer-readable medium, such as storage device 1125, or from another device via communication interface 1140. The software instructions contained in main memory 1115 may direct processor 1110 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 1100 may include additional components, fewer components, different components, or differently arranged components than are shown in FIG. 11.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-implemented method for displaying augmented reality (AR) content within an AR device coupled to one or more physical loupe lenses, the method comprising:

obtaining calibration parameters defining a magnified display portion within a display of the AR device, wherein the magnified display portion aligns with a boundary encompassing the one or more physical loupe lenses;

receiving the AR content for display within the AR device; and rendering the AR content within the display, wherein rendering the AR content comprises:

identifying a magnified portion of the AR content to be displayed within the magnified display portion, rendering the magnified portion of the AR content within the magnified display portion at a magnification consistent with a magnification of real-world imagery as seen by a user through the one or more physical loupe lenses, rendering a non-magnified portion of the AR content outside of the magnified display portion, wherein the AR content appears magnified within a view of the user through the one or more physical loupe lenses, and wherein the AR content appears to be non-magnified outside of the view of the user through the one or more physical loupe lenses, and rendering the AR content within an occluded portion of the display, wherein the occluded portion of the display comprises a boundary of the magnified display portion.

2. The method of claim 1, further comprising:

obtaining system calibration parameters, the obtaining the system calibration parameters comprising:

receiving an input calibration image from a calibration camera;

measuring distortion caused by the one or more physical loupe lenses based on the received input calibration image; and storing system calibration parameters based on the measured distortion, wherein the rendering the magnified portion of the AR content includes applying the system calibration parameters.

3. The method of claim 1, wherein the obtaining calibration parameters comprises:

presenting a calibration interface having loupe boundaries displayed within the AR device;

receiving user input, via the calibration interface, defining the magnified display portion; and receiving user input defining alignment information.

4. The method of claim 3, wherein the alignment information is obtained using at least one of:

a single point active alignment method (SPAAM);

eye-based tracking calibration;

Interaction-Free Display Calibration (INDICA); and

Display-relative Calibration (DRC).

5. The method of claim 1, wherein rendering the magnified portion of the AR content comprises projection mapping the AR content to the magnified display portion.

6. The method of claim 1, wherein the calibration parameters further define a projective mapping for the magnified display portion and a projective mapping for a non-magnified display portion.

7. A computer program product comprising a non-transitory computer readable storage medium having program instructions embodied therewith, the program instructions being executable by an augmented reality (AR) device and causing the AR device to perform operations comprising:

obtaining calibration parameters defining a magnified display portion within a display of the AR device, wherein the magnified display portion aligns with a boundary encompassing one or more physical loupe lenses coupled to the AR device;

receiving AR content for display within the AR device; and rendering the AR content within the display, wherein the rendering the AR content comprises:

identifying a magnified portion of the AR content to be displayed within the magnified display portion, rendering the magnified portion of the AR content within the magnified display portion at a magnification consistent with a magnification of real-world imagery as seen by a user through the one or more physical loupe lenses, rendering a non-magnified portion of the AR content outside of the magnified display portion, wherein the AR content appears magnified within a view of the user through the one or more physical loupe lenses, and wherein the AR content appears to be non-magnified outside of the view of the user through the one or more physical loupe lenses, and rendering the AR content within an occluded portion of the display, wherein the occluded portion of the display comprises a boundary of the magnified display portion.

8. The computer program product of claim 7, the operations further comprising: obtaining system calibration parameters, the obtaining the system calibration parameters comprising:

receiving an input calibration image from a calibration camera;

measuring distortion caused by the one or more physical loupe lenses based on the received input calibration image; and storing system calibration parameters based on the measured distortion, wherein the rendering the magnified portion of the AR content includes applying the system calibration parameters.

9. The computer program product of claim 7, wherein the obtaining calibration parameters comprises:

presenting a calibration interface having loupe boundaries displayed within the AR device;

receiving user input, via the calibration interface, defining the magnified display portion; and receiving user input defining alignment information.

10. The computer program product of claim 9, wherein the alignment information is obtained using at least one of:

a single point active alignment method (SPAAM);

eye-based tracking calibration;

Interaction-Free Display Calibration (INDICA); and

Display-relative Calibration (DRC).

11. The computer program product of claim 7, wherein rendering the magnified portion of the AR content comprises projection mapping the AR content to the magnified display portion.

12. The computer program product of claim 7, wherein the calibration parameters further define a projective mapping for the magnified display portion and a projective mapping for a non-magnified display portion.

13. A system comprising:

a processor, a computer readable memory, a non-transitory computer readable storage medium associated with an augmented reality (AR) device, and program instructions executable by the AR device to cause the AR device to perform operations comprising:

obtaining calibration parameters defining a magnified display portion within a display of the AR device, wherein the magnified display portion aligns with a boundary encompassing one or more physical loupe lenses coupled to the AR device;

receiving AR content for display within the AR device; and rendering the AR content within the display, wherein the rendering the AR content comprises:

identifying a magnified portion of the AR content to be displayed within the magnified display portion, rendering the magnified portion of the AR content within the magnified display portion at a magnification consistent with a magnification of real-world imagery as seen by a user through the one or more physical loupe lenses, rendering a non-magnified portion of the AR content outside of the magnified display portion, wherein the AR content appears magnified within a view of the user through the one or more physical loupe lenses, and wherein the AR content appears to be non-magnified outside of the view of the user through the one or more physical loupe lenses, and rendering the AR content within an occluded portion of the display, wherein the occluded portion of the display comprises a boundary of the magnified display portion.

14. The system of claim 13, the operations further comprising:

obtaining system calibration parameters, the obtaining the system calibration parameters comprising:

receiving an input calibration image from a calibration camera;

measuring distortion caused by the one or more physical loupe lenses based on the received input calibration image; and storing system calibration parameters based on the measured distortion, wherein the rendering the magnified portion of the AR content includes applying the system calibration parameters.

15. The system of claim 13, wherein the obtaining calibration parameters comprises: presenting a calibration interface having loupe boundaries displayed within the AR device;

receiving user input, via the calibration interface, defining the magnified display portion; and receiving user input defining alignment information.

16. The system of claim 15, wherein the alignment information is obtained using at least one of:

a single point active alignment method (SPAAM);

eye-based tracking calibration;

Interaction-Free Display Calibration (INDICA); and

Display-relative Calibration (DRC).

17. The system of claim 13, wherein rendering the magnified portion of the AR content comprises projection mapping the AR content to the magnified display portion.

* * * * *